US006681234B2

(12) United States Patent
Sokolov et al.

(10) Patent No.: US 6,681,234 B2
(45) Date of Patent: Jan. 20, 2004

(54) METHOD AND APPARATUS FOR STORING LONG-LIVED OBJECTS IN A VIRTUAL MACHINE

(75) Inventors: Stepan Sokolov, Fremont, CA (US); David Wallman, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 457 days.

(21) Appl. No.: 09/736,655

(22) Filed: Dec. 12, 2000

(65) Prior Publication Data

US 2002/0073404 A1 Jun. 13, 2002

(51) Int. Cl.⁷ .............................................. G06F 17/30
(52) U.S. Cl. ...................................... 707/206; 707/207
(58) Field of Search ................................ 707/206, 203, 707/103 R, 103 Y, 103 Z; 71/207; 717/154

(56) References Cited

U.S. PATENT DOCUMENTS

| | | | | |
|---|---|---|---|---|
| 5,136,706 A | * | 8/1992 | Courts | 707/206 |
| 5,911,076 A | | 6/1999 | Acker et al. | 707/1 |
| 6,125,434 A | * | 9/2000 | Willard et al. | 707/206 |
| 6,141,792 A | | 10/2000 | Acker et al. | 717/5 |
| 6,167,564 A | | 12/2000 | Fontana et al. | 717/1 |
| 6,178,545 B1 | | 1/2001 | Nagashima et al. | 717/2 |
| 6,199,195 B1 | | 3/2001 | Goodwin et al. | 171/1 |
| 6,434,575 B1 | * | 8/2002 | Berry et al. | 707/206 |
| 6,446,257 B1 | * | 9/2002 | Pradhan et al. | 707/206 |
| 6,457,111 B1 | * | 9/2002 | Howard et al. | 707/206 |

FOREIGN PATENT DOCUMENTS

WO    WO 00/00885    1/2000

OTHER PUBLICATIONS

Yuping Ding; Xining Li Titled "Cache performance of chronological garbage collection" IEEE Canadian Conference on, vol: 1, May 24–28, 1998 pp(s) 1–4 vol. 1.*
Publication entitled "Garbage Collection of Strings and Linked Data Structures in Real Time", By K. Nilsen, The University of Arizona, XP–000002201, Software Practice & Experience, No. 7, Jul. 1988, pp. 613–640.
Publication entitled "Fast Allocation and Deallocation of Memory Based on Object Lifetimes", By David R. Hanson, Princeton University, XP–000095792, Software Practice & Experience, vol. 20, Jan. 1990, pp. 5–12.

(List continued on next page.)

Primary Examiner—Diane D. Mizrahi
(74) Attorney, Agent, or Firm—Park, Vaughan & Flemming LLP; Edward J. Grundlen

(57) ABSTRACT

One embodiment of the present mechanism provides a system for storing long-lived objects defined within an object-oriented programming system. These long-lived objects are created in a virtual machine used for executing platform-independent code and are ordinarily created during initialization of the virtual machine. The system works by allocating a storage area reserved for long-lived objects that is not subject to garbage collection. After the storage area is allocated, the system receives requests to create an object. The system then determines if the object is a long-lived object by referring to a table of long-lived objects. If the object is a long-lived object, it is created and placed in the reserved storage area.

18 Claims, 2 Drawing Sheets

OTHER PUBLICATIONS

Publication entitled "Tenuring Policies for Generation–Based Storage Reclamation", By David Ungar et al., Stanford University, XP–000299812, 1998, ACM, pp. 1–17.

Publication entitled "Distinguishing Between Prolific and Non–Proflific Types for Efficient Memory Management", By Yefim Shuf et al., IBM T.J. Watson Research Center, Princeton University, XP–002212206, Published May 4, 2001, pp. 1–13.

Publication entitled "Distributed Garbage Collection for the Parallel Inference Machine Pie64", By Lu Xu et al., University of Tokyo, Xp–000079027, Information Processing 89, Elsevier Science Publishers, 1989, pp. 1161–1166.

Publication entitled "Using Lifetime Predictors to Improve Memory Allocation ", By David A. Barrett et al., University of Colorado XP–002212138, ACM, 1983, pp. 187–196.

Publication entitled "A Real–Time Garbage Collector Based on the Lifetimes of Objects", By Henry Lieberman et al., MIT Artificial Intelligence Laboratory, XP–002118650, 8070 Communications of the Association of Computing Machinery, vol. 26, Jun. 1983, No. 6, New York, pp. 419–429.

Publication entitled "Generational Stack Collection and Profile–Driven Pretenuring", By Perry Cheng et al., Carnegie Mellon University, XP–000766268, 1998, ACM, pp. 162–172.

Publication entitled "Generational Garbage Collection", XP–002141155, Published 1996, pp. 143–163.

Publication entitled "Uniprocessor Garbage Collection Techniques", By Paul R. Wilson, University of Texas, XP–002115784, Published 1992, pp. 1–42.

* cited by examiner

METHOD AND APPARATUS FOR STORING LONG-LIVED OBJECTS IN A VIRTUAL MACHINE

RELATED APPLICATION

The subject matter of this application is related to the subject matter in a co-pending non-provisional application by the same inventors as the instant application and filed on the same day as the instant application entitled, "METHOD AND APPARATUS FOR STORING SHORT-LIVED OBJECTS IN A VIRTUAL MACHINE," having Ser. No. 09/736,645, and filing date TO BE ASSIGNED.

BACKGROUND

1. Field of the Invention

The present invention relates to objects defined within an object-oriented computer programming system. More specifically, the present invention relates to a method and apparatus for storing long-lived objects within an object-oriented computer programming system.

2. Related Art

The recent proliferation of ever smaller and more capable computing devices has lead to the use of platform-independent programming languages on these smaller devices. Platform-independent programming languages facilitate the creation of programs that can be compiled to a set of platform-independent codes, which can be executed on a variety of computing devices. Many of these computing devices have a virtual machine (VM) containing an interpreter or just-in-time compiler to execute these platform-independent codes. The JAVA™ programming language is an example of a platform-independent programming language and JAVA bytecodes are an example of platform-independent codes.

The terms JAVA, JVM and JAVA VIRTUAL MACHINE are registered trademarks of SUN Microsystems, Inc. of Palo Alto, Calif.

Many VMs use an area of memory called a heap to store various objects. When an object in the heap is no longer needed, all references pointing to the object will have been deleted. However, the object continues to occupy space in the heap. In some VMs, a computer program called a garbage collector scans the heap and deletes objects that are not being referenced in order to reclaim unused space in the heap.

There are many implementations of garbage collectors, however, they all share some traits. Garbage collectors require resources of the computing device in order to operate, thereby using storage space and slowing execution times of running programs. There have been many attempts to reduce the impact of garbage collection on executing programs. For instance, a garbage collector can be run in a separate execution thread. If the computing device has more than one processor, the separate execution thread can run on another processor, thereby reducing the impact on the main execution thread.

Another attempt to reduce the impact of garbage collection involves the use of so called "generational garbage collectors." These work by migrating long-lived objects to an area of the heap where garbage collection is performed less often.

Neither of these techniques, however, is well suited for small computing devices. Small computing devices have only one processor, therefore running a separate garbage collection thread causes the main program thread to be "swapped out" during garbage collection. Furthermore, generational garbage collectors require large amounts of storage space, which may not be available on a small computing device.

Moreover, during initialization, many VMs generate a large number of objects that will remain active during the lifetime of the VM. For example, the JAVA runtime environment creates a large number of java.lang.String objects, which remain available for the duration of the program. These objects occupy a considerable portion of the heap and, as a result, cause the garbage collector to consume a considerable amount of processor time, even though these objects are never removed by the garbage collector.

What is needed is a system that eliminates the waste of resources caused by the garbage collector operating on objects that will never be deleted.

SUMMARY

One embodiment of the present invention provides a system for storing long-lived objects defined within an object-oriented programming system. These long-lived objects are created in a virtual machine used for executing platform-independent code and are ordinarily created during initialization of the virtual machine. The system works by allocating a storage area reserved for long-lived objects that is not subject to garbage collection. After the storage area is allocated, the system receives requests to create an object. The system then determines if the object is a long-lived object by referring to a table of long-lived objects. If the object is a long-lived object, it is created and placed in the reserved storage area.

In one embodiment of the present invention, the reserved storage area is an area of a heap used by the virtual machine.

In one embodiment of the present invention, the remainder of the heap is subject to garbage collection.

In one embodiment of the present invention, the long-lived object is a persistent string object.

In one embodiment of the present invention, the persistent string object is a java.lang.String object.

In one embodiment of the present invention, the system closes the reserved storage area to new objects when initialization of the virtual machine is complete.

In one embodiment of the present invention, the system allows a garbage collector to reclaim unused storage in the reserved storage area one time just prior to closing the storage area.

In one embodiment of the present invention, the virtual machine is a JAVA VIRTUAL MACHINE.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
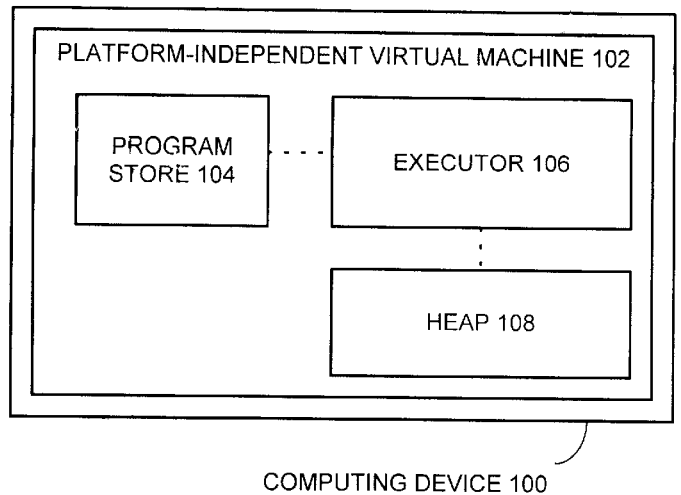
FIG. 1 illustrates computing device 100 in accordance with an embodiment of the present invention.

FIG. 1 illustrates computing device 100 in accordance with an embodiment of the present invention. Computing device 100 may include any type of computer system, including, but not limited to, a computer system based on a microprocessor, a mainframe computer, a digital signal processor, a personal organizer, a device controller, and a computational engine within an appliance.

Included within computing device 100 is platform-independent virtual machine 102. In one embodiment of the present invention, platform-independent virtual machine 102 is a JAVA VIRTUAL MACHINE. Platform-independent virtual machine 102 includes program store 104, executor 106 and heap 108.

Program store 104 stores and provides the instructions that executor 106 uses to perform operations directed by a program.

Executor 106 performs operations within platform-independent virtual machine 102 as directed by the program code stored in program store 104. In one embodiment of the present invention, executor 106 is implemented as an interpreter, which interprets the platform-independent code within program store 104.

Heap 108 stores objects created within an object-oriented programming system. These objects include long-lived objects, which are created during initialization of platform-independent virtual machine 102, and which are not deleted during the lifetime of platform-independent virtual machine 102.

Platform-Independent Virtual Machine

Figure 2:
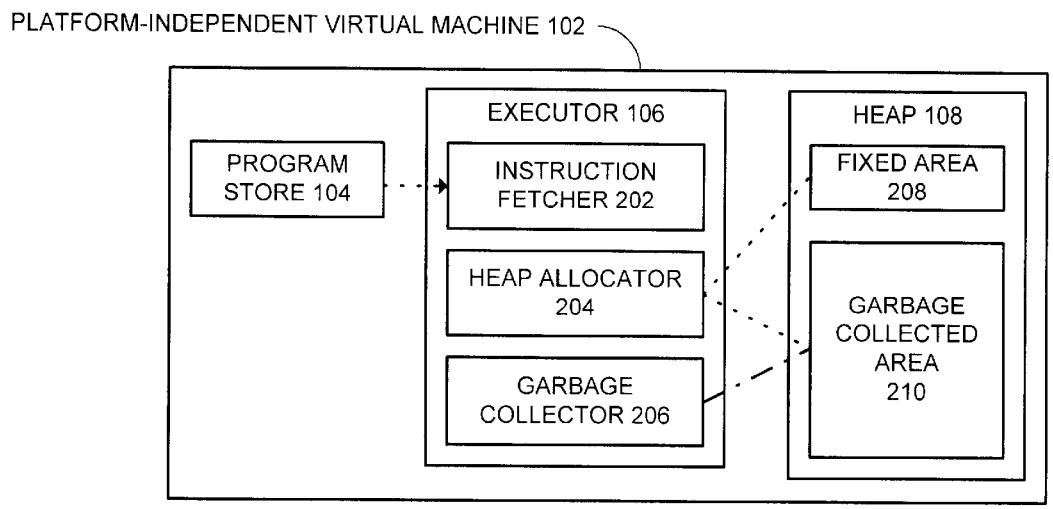
FIG. 2 illustrates platform-independent virtual machine 102 in accordance with an embodiment of the present invention.

FIG. 2 illustrates platform-independent virtual machine 102 in accordance with an embodiment of the present invention. As described above, platform-independent virtual machine 102 includes executor 106. Executor 106 includes instruction fetcher 202, heap allocator 204, and garbage collector 206.

Platform-independent virtual machine 102 also includes heap 108 as described above. Heap 108 includes fixed area 208 and garbage collected area 210.

During initialization of platform-independent virtual machine 102, instruction fetcher 202 fetches instructions from program store 104 for execution by executor 106. If the fetched instruction is an instruction to create a new object, heap allocator 204 determines if the object is a long-lived object by consulting a table (not shown) of long-lived objects. Note that a code profiler can be used to analyze existing code to identify long-lived objects. For example, use of a code profiler on existing JAVA code has shown that string objects created during initialization, such as java.lang.String objects, usually remain active for the lifetime of the VM. If the object is a long-lived object, heap allocator 204 places the object in fixed area 208. If the object is not a long-lived object, heap allocator 204 places the object in garbage collected area 210.

When initialization of platform-independent virtual machine 102 is complete, executor 106 closes fixed area 208 so new objects can no longer be placed within fixed area 208. Optionally, executor 106 causes garbage collector 206 to collect garbage once within fixed area 208 prior to closing fixed area 208.

During normal operation, garbage collector 206 periodically visits each object within garbage collected area 210 to determine if the object is still referenced from within the system. If there are no references to an object within garbage collected area 210, garbage collector 206 deletes the object and reclaims its memory space within garbage collected area 210. Garbage collector 206 can also relocate objects within garbage collected area 210 so that gargage collected area 210 may be used more efficiently.

Executor 106 can also trigger garbage collector 206 to perform a garbage collection on fixed area 208 as described above. When used to perform garbage collection on fixed area 208, garbage collector 206 can be configured to use a different garbage collection algorithm than the algorithm used for garbage collected area 210.

Initializing the Virtual Machine

Figure 3:
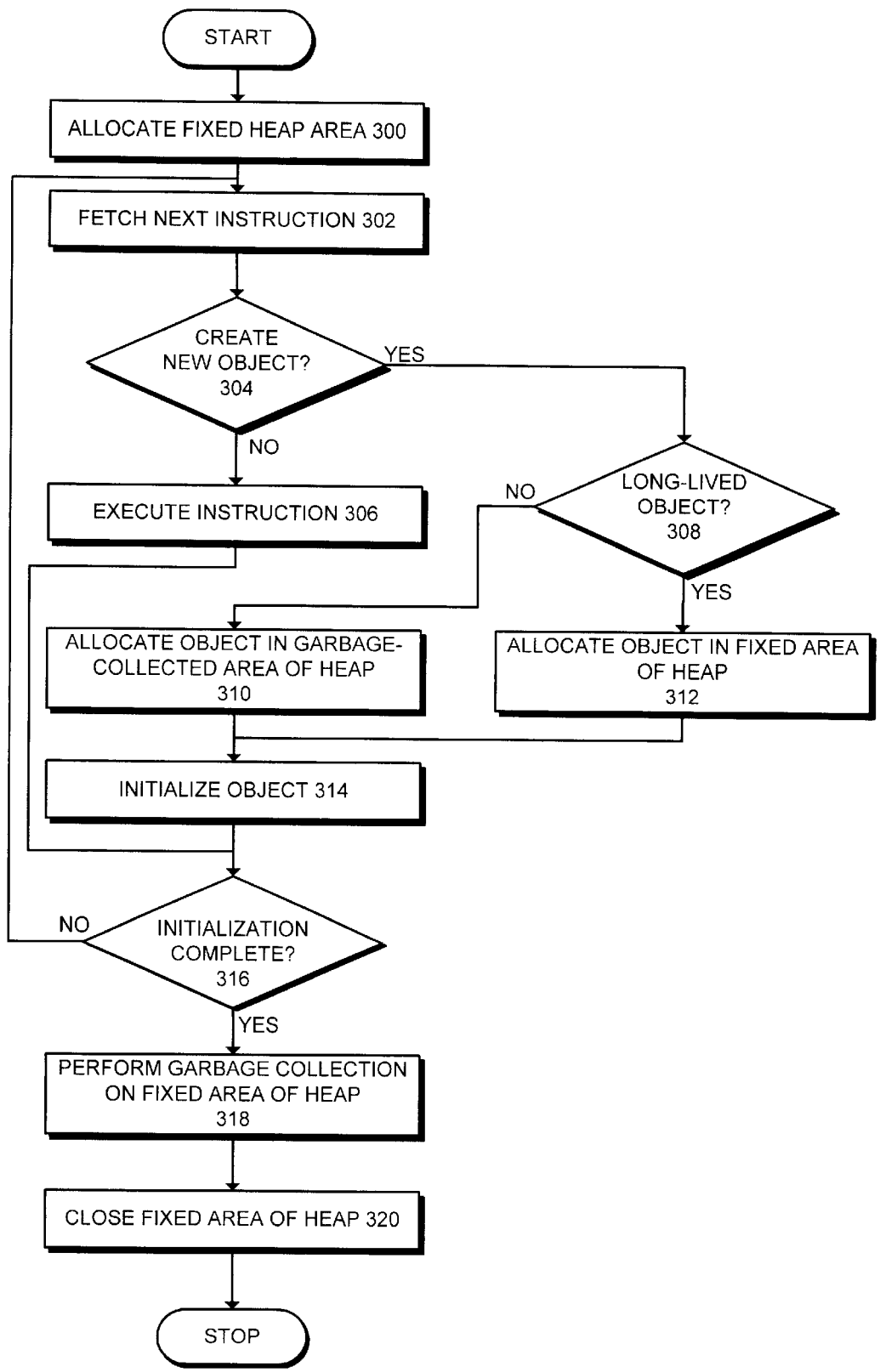
FIG. 3 is a flowchart illustrating the process of creating objects during initialization of a virtual machine in accordance with an embodiment of the present invention.

FIG. 3 is a flowchart illustrating the process of creating objects during initialization of a virtual machine in accordance with an embodiment of the present invention. The system starts when executor 106 creates fixed area 208 within heap 108 (step 300).

Next, instruction fetcher 202 fetches an instruction from program store 104 (step 302). Executor 106 determines if the instruction creates a new object (step 304).

If the instruction creates a new object, heap allocator 204 determines if the object is a long-lived object by referring to a table of long-lived objects (step 308). Creating the new object and determining if the object is a long-lived object are elements of the "new" function of heap allocator 204, which creates objects. If the object is a long-lived object, heap allocator 204 allocates the object in fixed area 208 of heap 108 (step 312). If the object is not a long-lived object, heap allocator 204 allocates the object in garbage collected area 210 of heap 108 (step 310).

After heap allocator 204 has allocated the object in either of steps 312 or 310, executor 106 initializes the object (step 314).

If the instruction does not create a new object at step 304, executor 106 executes the instruction (step 306).

After initializing the object at step 314, or after executing the instruction at step 306, executor 106 determines if initialization is complete (step 316). If initialization is not complete, executor 106 returns to step 302 to fetch another instruction and continue the initialization.

If initialization is complete, garbage collector 206 optionally performs garbage collection on fixed area 208 within heap 108 (step 318). Finally, executor 106 closes fixed area 208 of heap 108 so that no new objects can be placed there.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present inven-

What is claimed is:

1. A method for storing long-lived objects defined within an object-oriented programming system in a virtual machine for executing platform-independent code, wherein long-lived objects are created during initialization of the virtual machine, the method comprising;

allocating a storage area reserved for long-lived objects, wherein the storage area is not subject to garbage collection;

receiving a request to create an object;

determining if the object is identified in a table of long-lived objects;

if the object is identified as a long-lived object, creating the long-lived object, and placing the long-lived object in the storage area;

allowing a garbage collector to reclaim unused storage in the storage area one time just prior to closing the storage area; and closing the storage area to new objects when initialization of the virtual machine is complete.

2. The method of claim 1, wherein the storage area is an area of a heap used by the virtual machine.

3. The method of claim 2, wherein a remainder of the heap is subject to garbage collection.

4. The method of claim 1, wherein the long-lived object is a persistent string object.

5. The method of claim 4, wherein the persistent string object is a java.lang.String object.

6. The method of claim 1, wherein the virtual machine is a JAVA VIRTUAL MACHINE.

7. A computer-readable storage medium storing instructions that when executed by a computer cause the computer to perform a method for storing long-lived objects defined within an object-oriented programming system in a virtual machine for executing platform-independent code, wherein long-lived objects are created during initialization of the virtual machine, the method comprising;

allocating a storage area reserved for long-lived objects, wherein the storage area is not subject to garbage collection;

receiving a request to create an object;

determining if the object is identified in a table of long-lived objects;

if the object is identified as a long-lived object, creating the long-lived object, and placing the long-lived object in the storage area;

allowing a garbage collector to reclaim unused storage in the storage area one time just prior to closing the storage area; and closing the storage area to new objects when initialization of the virtual machine is complete.

8. The computer-readable storage medium of claim 7, wherein the storage area is an area of a heap used by the virtual machine.

9. The computer-readable storage medium of claim 8, wherein a remainder of the heap is subject to garbage collection.

10. The computer-readable storage medium of claim 7, wherein the long-lived object is a persistent string object.

11. The computer-readable storage medium of claim 10, wherein the persistent string object is a java.lang.String object.

12. The computer-readable storage medium of claim 7, wherein the virtual machine is a JAVA VIRTUAL MACHINE.

13. An apparatus that facilitates storing long-lived objects defined within an object-oriented programming system in a virtual machine for executing platform-independent code, wherein long-lived objects are created during initialization of the virtual machine, the apparatus comprising;

an allocating mechanism that is configured to allocate a storage area reserved for long-lived objects, wherein the storage area is not subject to garbage collection;

a receiving mechanism that is configured to receive a request to create an object;

a determining mechanism that is configured to determine if the object is identified in a table of long-lived objects;

a creating mechanism that is configured to create a long-lived object;

a placing mechanism that is configured to place the long-lived object in the storage area;

a garbage collection triggering mechanism that is configured to trigger a garbage collector to reclaim unused storage in the storage area one time just prior to closing the storage area; and a closing mechanism that is configured to close the storage area to new objects when initialization of the virtual machine is complete.

14. The apparatus of claim 13, wherein the storage area is an area of a heap used by the virtual machine.

15. The apparatus of claim 14, wherein a remainder of the heap is subject to garbage collection.

16. The apparatus of claim 13, herein the long-lived object is a persistent string object.

17. The apparatus of claim 16, wherein the persistent string object is a java.lang.String object.

18. The apparatus of claim 13, wherein the virtual machine is a JAVA VIRTUAL MACHINE.

* * * * *